(12) United States Patent
Simske et al.

(10) Patent No.: US 10,621,481 B2
(45) Date of Patent: *Apr. 14, 2020

(54) GENERATING A REGRESSIVE INFORMATION OBJECT

(71) Applicant: Hewlett-Packard Development Company, L.P., Houston, TX (US)

(72) Inventors: Steven J Simske, Fort Collins, CO (US); A. Marie Vans, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,846

(22) Filed: Jun. 18, 2018

(65) Prior Publication Data

US 2019/0385032 A1    Dec. 19, 2019

Related U.S. Application Data

(63) Continuation of application No. 14/419,793, filed as application No. PCT/US2012/053029 on Aug. 30, 2012, now Pat. No. 10,176,174.

(51) Int. Cl.
    *G06K 19/06*     (2006.01)
    *G06Q 10/10*     (2012.01)
    *G06Q 10/06*     (2012.01)

(52) U.S. Cl.
    CPC . *G06K 19/06028* (2013.01); *G06K 19/06037* (2013.01); *G06Q 10/0633* (2013.01); *G06Q 10/103* (2013.01)

(58) Field of Classification Search
    None
    See application file for complete search history.

(56) References Cited

U.S. PATENT DOCUMENTS

| | | | |
|---|---|---|---|
| 7,207,481 B2 | 4/2007 | Barenburg et al. | |
| 7,905,409 B2 | 3/2011 | Bybell et al. | |
| 8,047,447 B2 | 11/2011 | Bulan et al. | |
| 8,267,321 B2 | 9/2012 | Kuyper-Hammond et al. | |
| 10,176,174 B2 * | 1/2019 | Simske | G06Q 10/103 |
| 2005/0008261 A1 | 1/2005 | Wolff et al. | |
| 2005/0029354 A1 | 2/2005 | Frantz et al. | |

(Continued)

FOREIGN PATENT DOCUMENTS

AU    2011244939 A1    11/2011
CA       2535409 A1     4/2005

(Continued)

OTHER PUBLICATIONS

Youssef et al, "Automated Barcode Recognition for Smart Identification and Inspection Automation", Jrnl Expert Systems with Applications, V 33(4), Nov. 2007.

*Primary Examiner* — Kristy A Haupt
(74) *Attorney, Agent, or Firm* — HP Inc. Patent Department (57) ABSTRACT

Example embodiments disclosed herein relate to generating a regressive information object. Information is encoded into an information object at states in a workflow. Information is encoded such that information encoded in a last state in the workflow is readable by an information object reader and information encoded in states prior to the last state is not readable by the information object reader.

14 Claims, 4 Drawing Sheets

(56) References Cited

U.S. PATENT DOCUMENTS

| | | |
|---|---|---|
| 2005/0269416 A1 | 12/2005 | Sussmeier et al. |
| 2006/0118631 A1 | 6/2006 | Lubow et al. |
| 2007/0096907 A1 | 5/2007 | Jam |
| 2009/0103803 A1 | 4/2009 | Kumar |
| 2009/0200379 A1 | 8/2009 | Kuyper-Hammond et al. |
| 2010/0155479 A1 | 6/2010 | Ming |
| 2011/0142294 A1 | 6/2011 | Sagan et al. |

FOREIGN PATENT DOCUMENTS

| | | |
|---|---|---|
| CN | 102498698 | 6/2012 |
| KR | 10-2007-0110103 A | 11/2007 |
| WO | WO-2011006201 A1 | 1/2011 |
| WO | WO-2012050571 A1 | 4/2012 |

* cited by examiner

GENERATING A REGRESSIVE INFORMATION OBJECT

CROSS-REFERENCE TO RELATED APPLICATIONS

This Application is a continuation of U.S. patent application Ser. No. 14/419,793, filed Feb. 5, 2015, now U.S. Pat. No. 10,176,174, which is the National Stage of International Application No. PCT/US2012/053029, filed Aug. 30, 2012, both of which are hereby incorporated by reference within.

BACKGROUND

Products may include both physical and information-containing items, such as produce, documents, labels, books, software, images, and the like. For example, documents may exist in both physical (e.g., printed) and electronic forms. During its lifecycle (i.e., the document in all its forms from creation to completion), a document may move between physical (e.g., paper) and electronic (e.g., computer file) forms several times as it progresses in its lifecycle.

BRIEF DESCRIPTION OF THE DRAWINGS

The following detailed description references the drawings, wherein.

DETAILED DESCRIPTION

Examples disclosed herein relate to generating a regressive information object as a document progresses through multiple states of a workflow, during the document's lifecycle. The described examples provide means for monitoring the progress of the document during its lifecycle in a secured manner. For example, the document may be tagged by at least one of a barcode, a binary string, or other security marks and only the last state in the workflow is readable by an industry standard reader. For example, the document may be encoded with information in each state such that is ambiguity in guessing forward to a next state or guessing backwards to a previous state in the workflow, thereby enhancing the security of the document. Moreover, the information object (IO) does not grow in size and/or shape as the document moves through states in the workflow, even though information is added at each stage, thereby reducing a footprint of the IO on the document.

An information object (IO) is any type of standard mark that is used to convey information about a product or service. An incremental information object (IIO) is an IO that is incrementally filled with information associated with a workflow progression (i.e., incremental/progressive information). The IO is static and may be read by a standard optical reader (i.e., a standard IO reader). For example, the IO may be a barcode such as a two-dimensional (2D) data matrix or a quick response (QR) code. A workflow is a defined set of states, usually with task(s) at each state, which a product (e.g., a document) must pass through during its lifecycle, to perform some useful purpose. For example, the workflow is an automated process during which documents, information, and/tasks are passed from one participant to the other for action or informative purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics (e.g., inventory, average time at a node, etc), compliance, auditing, etc.). In other words, a workflow is any defined set of tasks to complete associated with a document.

In addition, an IO may be incremental in nature. An IO that has additional incremental information added is termed an IIO. For example, incremental progressive information may be added to an IO in each state of the workflow, thus potentially making the IO non-standard and separate/distinct from the IO. For example, the IIO may be unreadable by the standard IO reader. To illustrate, the IIO may represent a progressive IIO where contents of the IIO is readable by a standard IO reader, or represent a regressive IIO where the contents of the IIO is not readable until a last state in the workflow is reached.

A state in a workflow corresponds with a current version of the document. For example, if a document moves from a creator to an editor to a subscriber, the respective states correspond with a current version (whether physical or electronic) of the document (e.g., a composite document, or a document including several items (e.g., PDFs, PPTs, DOCs, etc.)). It is to be understood that states can be in parallel, for example, when multiple recipients need to acknowledge receipt. The document and its associated IO may be physical (e.g., print over the same sheet at each state in the workflow), electronic (e.g., information added electronically), and/or mixed physical and electronic (e.g., printed and scanned, information added electronically, and then re-printed). In addition to writing progressive information to the IO in each state of the workflow, security features may be implemented. For example, a barcode may protect an associated document from counterfeiting and falsifications by providing security features.

One approach for generating a barcode is to use a single (i.e., the same) barcode throughout the workflow to identify the document. However, this approach does not enable one to monitor the status of the workflow via the barcode. Another approach is to use multiple barcodes. For example, multiple barcodes may be added by each entity or state within the workflow. This may be used to identify the document as it moves from one state to the next in its workflow. For example, multiple barcodes may be used to confirm the identity of a last party to handle the document. However, the use of multiple barcodes may take a substantial amount of space (or real estate), and the barcodes do not usually relate to each other in any visible way (e.g., to distinguish one state from another).

Moreover, using the same barcode throughout the workflow and using multiple barcodes in the workflow may not adequately secure the document. For example, the approaches described above do not ensure that only the final state is readable by the standard IO reader, where other states prior to the final state are unreadable by the standard IO reader. For example, it may be desirable to generate a barcode such that all states prior to the last state are unreadable by the standard IO reader (but readable by a customized proprietary IO reader) and the last state is readable by the standard IO reader, to enhance the security of the document. To illustrate, it may be desirable to secure a loan application process where the application passes through incremental approval stages where an entity in a non-final state is unable to decode or read the information on the application and only a final loan approval entity is able to read the applicant's information and approve the loan.

Accordingly, examples disclosed herein relate to generating a regressive information object (IO) (e.g., a feature or mark laden with information), where information encoded or written to the IO is readable by a standard IO reader (i.e., the IO is interpretable according to the standard) only when it is in the last state of its progression in the workflow. The IIO is regressive because content of the IIO is not readable by the standard IO reader until the last state has been reached. However, a proprietary IO reader may be configured (e.g., via a proprietary reading algorithm) to interpret the regressive IIO at every state. The regressive IIO may be implemented as a regressive barcode, as a binary string (e.g., a 1-incomplete), or any other regressive security mark. It should be noted that the regressive IIO may also be implemented such that the proprietary or custom IO reader may not interpret the regressive IO until the last state.

The regressive barcode affords an ecosystem of barcodes which can relate to previous and subsequent states with a given level of statistical ambiguity, providing both an inference and an obfuscation model for a large set of serialized items. In a progressive barcode, information is continually added to an existing barcode so that the content (or data) area of the barcode gets darker over time. Progressive barcodes can accommodate industry standard readable barcodes, such as the multi-data region 2D data matrix barcodes or QR codes. Information progresses because additional bits of information are written to white modules of the barcode, such that the white modules hold 2 bits of data (i.e., W=00, C=10, M=11, Y=01, where W, C, M, and Y represent white, cyan, magenta, and yellow colors, respectively) instead of previous 1 bit (W vs. K, where K represents the black color). In this way, the white spaces of a 2D data matrix (i.e., approximately half of the modules) can contain as much information as the whole black and white 2D data matrix barcode. This doubles the density of the barcode, affording a second pathway for information. Rather than incrementing from a known starting state, the regressive barcode decrements from a desired end state. The regressive barcode is only readable in standard barcode symbology when it is at the last state in its progression. Until then, there are too many 0's in the barcode (i.e., assuming a white background is "0") and the barcode is thus unreadable, in a manner referred to herein as "1-incomplete."

Alternately, the regressive barcode may be implemented as a 0-incomplete barcode, where it is only readable when it is in the last state in its progression. In this scenario, until the last state is reached, there are too many 1's in the barcode and progression along the workflow overwrites (or removes) the 1's with 0's until there are sufficient 0's in the regressive barcode to be interpretable by the standard IO reader. For example, in this case, progression along the workflow is indicated by more white spaces in the barcode.

In another example, the regressive information object may be implemented as a 1-incomplete binary string where the final binary string represents a standard interpretable binary string. For example, a 96-bit GS1 (global standard organization) GTIN (global trade identification number), which when underpopulated by 1's will generally not be interpretable. However, once the incremental 1's have been added to the sequence, the GTIN will be readable. As will be further described below, there will be ambiguity looking forward (i.e., guessing a next state) when the GTIN is 1-incomplete (i.e., multiple possible readable barcodes will contain all the 1's in the 1-incomplete current regressive IO state).

Accordingly, the described examples provide a means for incrementally tagging objects (e.g., a document) by at least one of a barcode, a 1-incomplete binary string, or other security marks, where only the last state is readable by an industry standard reader. Further, the described examples provide ambiguity in guessing forward to a next state or guessing backwards to a previous state in a workflow, because at any particular state S(t) in the workflow, there are numerous possible states looking backward to S(t−1) and looking forward to S(t+1).

Figure 1:
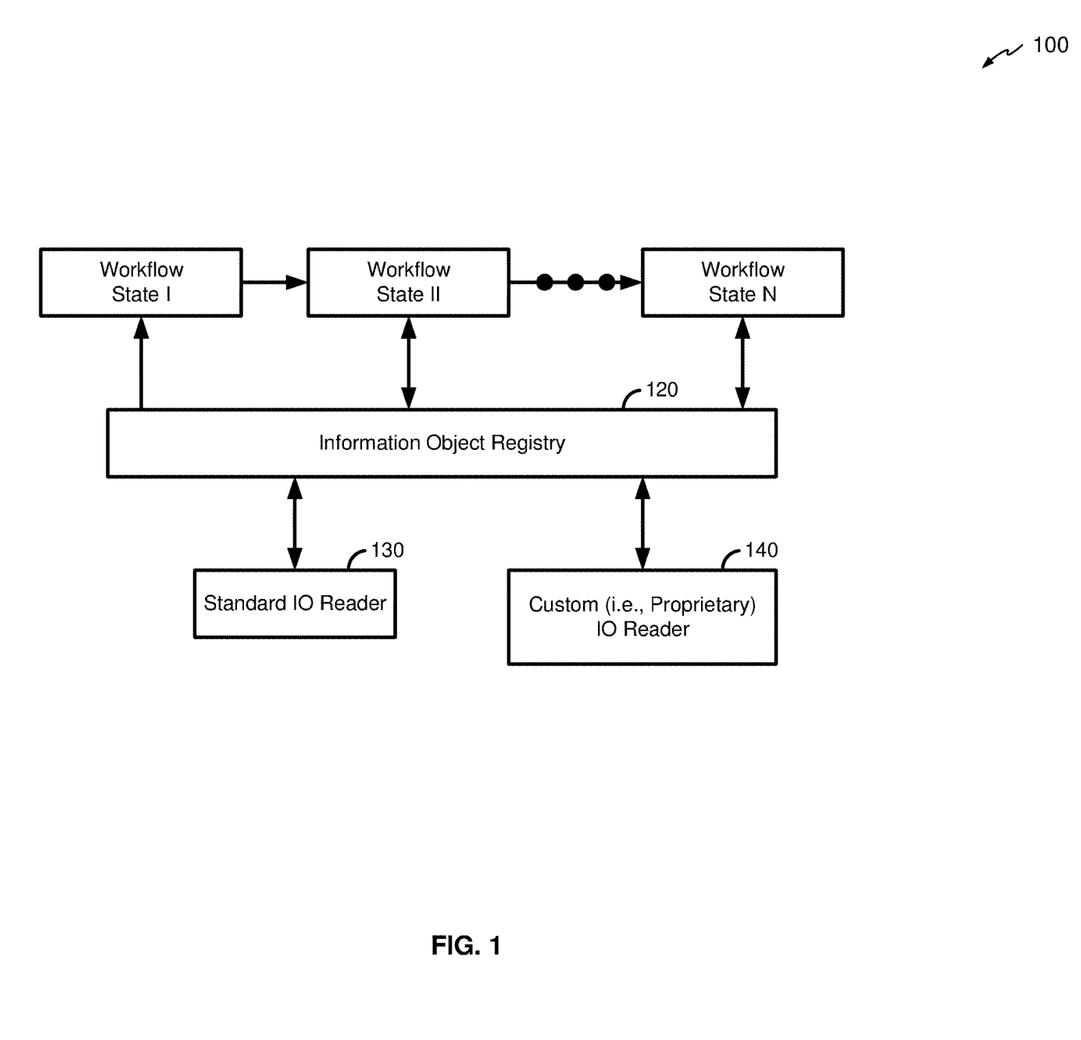
FIG. 1 is a schematic diagram of a system for generating a regressive information object, according to one example.

FIG. 1 is a schematic diagram of a system 100 for generating a regressive information object during a workflow, according to one example. The regressive information object is generated such that information encoded or written in the IO (or IIO) is not readable by a standard IO reader 130 until a last state (e.g., state N) has been reached. However, information encoded in the IO is readable by a custom proprietary IO reader at all states in the workflow.

Each state in the workflow may include associated systems (not shown) comprising units to provide the functionality used to generate the regressive IO (e.g., conceding information into the IO). For example, the states may include a central processing unit (CPU), a memory, a display, a human-machine interface, a printer, a network interface, and so on. The workflow may start at a first state. Any number of systems corresponding to the number of states in the workflow may be included, depending on the specific workflow. In addition a standard IO reader 130 and a custom (or proprietary) IO reader 140 may be used to image the IO and send the image through a network (not shown) to an IO registry 120 to determine the code within the IO. As previously mentioned, the custom IO reader 140 is able to decode and read the information in the IO at every state in the workflow. However, the standard IO reader 130 is only able to decode and read the information in the IO when it is at the last state (i.e., state N) in the workflow. For example, the custom IO reader 140 may be provided with custom algorithm used for decoding the information encoded in the IO, where such information is not readable by the standard IO reader 130. The IO registry 120 may send the code information back to the IO readers 130, 140. The IO readers 130, 140 may also operate independently of the system 100 by scanning and reading an IO without sending the IO image to the IO registry 120.

Registry 120 may include hardware (e.g., memory, processor, etc.) and/or software (computer program(s) with computer readable code) for generating a regressive IO that is unreadable/undecodable by the standard IO reader 130 until the last state in the workflow. Access to the registry 120 may be secure (e.g., requiring a login and password or other authorization method, such as biometric validation of identity, possession of a secure token, etc) or unsecure (e.g., publicly accessible).

The network may be a local area network (LAN), a wide area network (WAN), or the Internet, and may include both public and private network segments, such as virtual private networks (VPN). In an example, IO readers 130, 140 may be a mobile device or imaging device capable of behaving as an IO reader, while simultaneously sending the IO image through the network to the first state to be analyzed for progressive information. In another example, the IO readers 130, 140 may be used to obtain an IO that may be sent through the network to the first state, where it may be altered to become an IIO through the addition of very light colors to tiles within the IO.

The first state may access the registry 120 over the network to obtain additional information about the IO, such as rules for increasing the information density of the IO through the use of progressive color scales (i.e., overwriting lighter colors with darker colors or removing colors). For example, the first state may receive rules for encoding the IO with information such that the information is not readable or decodable by the standard IO reader 130. Other states in the workflow may have associated systems, such as the state two system and the state N system illustrated in FIG. 1. The first state system may be used either to coordinate the physical transfer of the document to the second system state or to directly transfer the document in electronic form. Similarly, the state two system may transfer or coordinate the transfer of the document to a next state (e.g., the state N system). At each state, information may be sent to the next state's system to encode or write information to the IO (or the IIO). For example, the information may include the rules used to increase the complexity of the IO at an earlier state in the workflow with progressive color scales, rules to encode the IIO such that it is not readable or decodable until the last state N, or any other rules that may be used to create an IIO from an IO. States, security levels, and the like may be added in the workflow by increasing the complexity of the IO. In an example, the system at a particular state can increase the amount of information stored within the IO or current IIO by communicating with the registry 120.

In one example, the system 100 may be set up as a cloud computing network, which is a virtualized bank of computers (e.g., processors and/or servers) that enables Internet-based computing. Via the cloud network, shared resources, software and information are provided to various computing devices (i.e., those operating at the various workflow states, whether stationary (e.g., desktop computers) or mobile (e.g., laptop computers, notebooks, cellular phones, personal digital assistants (PDA), etc.)) on-demand. The cloud computing network allows the registry system provider to deliver the information object registry 12 and its various services to subscribers online via another web service or software, such as a web browser. Software and data associated with the cloud computing network are stored on servers and their associated memory. In another example, the system 100 may be set up as a network for use with a proprietary system where a bank of computers enables computing based upon information that is received from a previous state and/or the registry 120. In this case, each computer has its own software and data stored on servers and their associated memory.

Figure 2:
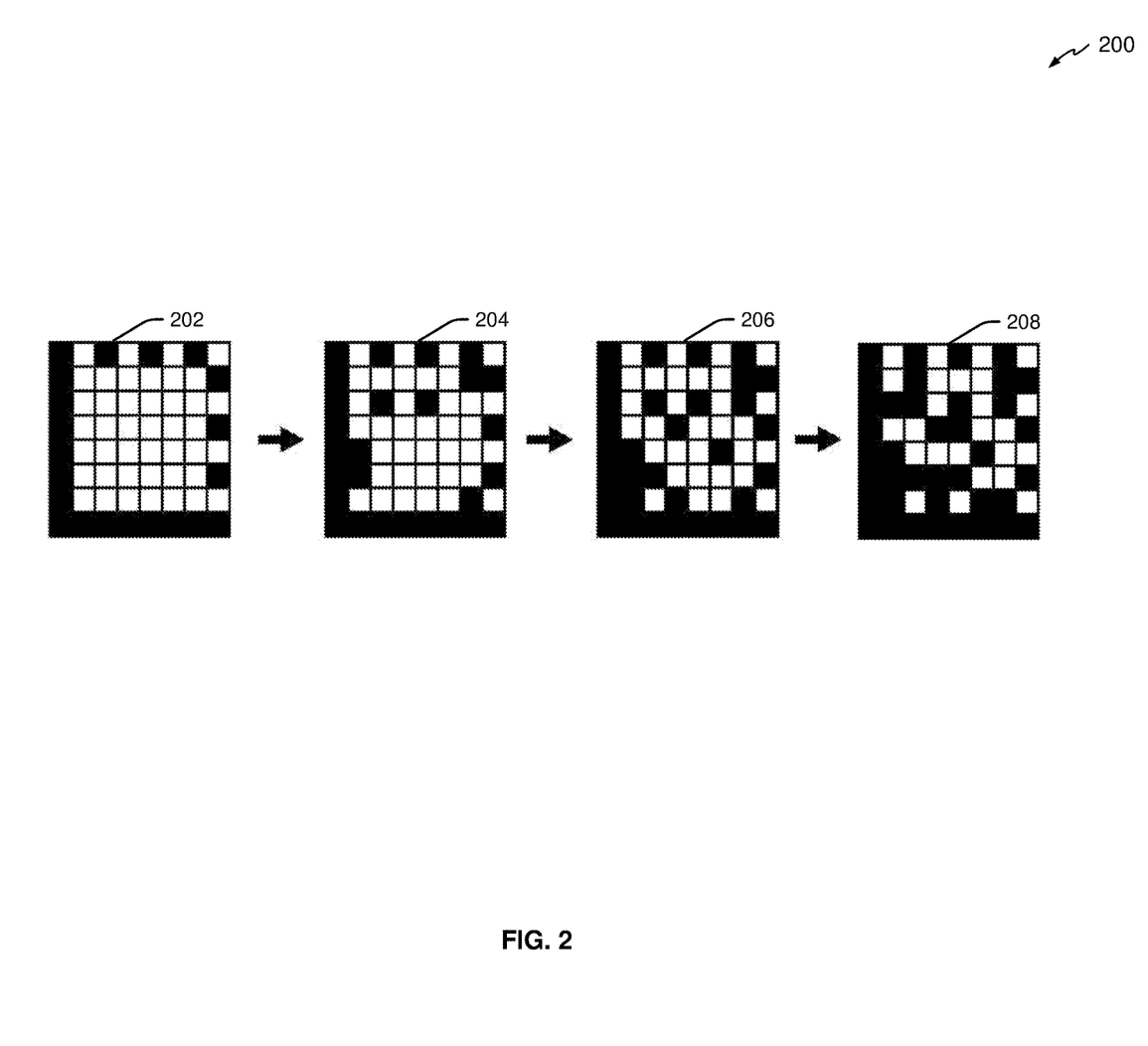
FIG. 2 is depicts an example of a regressive information object as it progresses through a workflow and information is written thereto.

FIG. 2 depicts an example of a regressive information object as it progresses through states in a workflow and has information written thereto. In the example of FIG. 2, regressive information object 200 comprises four states 202, 204, 206, and 208. Regressive information object 200 a field of modules/glyphs/area (e.g., marks, dots, graphics, symbols, etc.) that has two or more possible states, where each state is readily disambiguated from each other state. Each state 202-208 of the regressive information object 200 is determined by the set of glyphs that have been written to at a given state in the workflow. Progressive information may be added in the form of light, saturated color scales overwritten onto white tiles. In other examples, the progressive information may be added in the form of dark, unsaturated color scales overwritten onto black tiles.

The number of bits to write to the IO at each state of the workflow may be proportional to the desired minimum statistical security level at any given stage. For example, high-level security states may write more bits of information to the IO, while low-level security states may write less bits of information to the IO or current IO. However, for a maximum statistical security, half of the remaining 1's would be written to the IO. Both probability (i.e., what level of confidence is needed such that the next state of the IO cannot be guessed with p probability) and/or Hamming distance (i.e., the sum of bits, defined in the glyphs/areas of the IO, that are different from one state to the next) may be used to identify the number of bits to encode at each state of the given workflow. The Hamming distance between two sequences of bits S(a) and S(b), or HD (S(a), S(b)) is given by Eqn. 1.

$$HD(S(a),S(b))=\Sigma_{i=1}^{N}S(a)\otimes S(b) \qquad \text{Eqn. 1}$$

In Eqn. 1, $\otimes$ is the bit-wise XOR operator.

In one example, determining the probability involves determining the number of ways of writing to each state in the workflow. For writing M bits to the IO at a particular state with N glyphs still available for writing, there are $$\frac{N!}{M!(N-M)!}$$

ways of writing to the next state. To illustrate, suppose there are a total of 32 bits to write to a carrier object and it is desirable to include 4 bits at one state in the workflow. The IO selected should include at least 32 available glyphs for writing, and thus when encoding the 4 bits, the first bit could be written in 32 places, the second bit could be written in 31 places, the third bit could be written in 30 places, and the fourth bit could be written in 29 places. There are 24 different ways (orderings) to write these 4 bits, and as such there are (32*31*30*29)/(4*3*2*1)=35,960 unique ways to write the 4 bits in an IO having 32 available glyphs for writing. In this example, 35,960 unique ways to reach the next state represents more than $2^{15}$ different possibilities, and so effectively represents just over 15 bits of security. Additionally, this example represents a situation in which there is merely a one in a 35,960 chance of someone guessing the right way to write these glyphs. The probabilities for each state may be predicted in a similar manner.

Based on the above probabilities of writing to the glyphs, the regressive information object 200 can be generated for each state 202-208 in the workflow of FIG. 2. In the example of FIG. 2, at any state (St), there are numerous possible states looking backward to S(t−1) and looking forward to S(t+1). FIG. 2 depicts initial state S(0) represented as 202, second state S(1) represented as 204, third state S(2) represented as 206, and fourth state S(3) represented as 208 (i.e., the final state). In FIG. 2, only state S(3) (i.e., 208) is readable by the standard IO reader 130 of FIG. 1.

State S(3) contains 18 black pixels in the example of FIG. 2. Looking backward from S(3), there are:

$$\frac{18!}{[(12)!(6)!]} = 18,564$$

possible states for S(2) given the specific S(3), designated N[S(2)]←S(3). Looking forward from S(2), however, there are:

$$\frac{24!}{[(18)!(6)!]} = 134{,}596$$

possible states for S(3) given the specific S(3), designated S(2)→N[S(3)]. Whenever the final state contains only half 1's (and thus all previous states are 1-incomplete):

$$\{S(t-1) \to N[S(t)]\} > \{N[S(t-1)] \leftarrow S(t)\} \qquad \text{Eqn. 2}$$

The inequality of Eqn. 2 is useful for the purpose of bi-directional ambiguity associated with the regressive information object. This is because not all projections forward, S(t−1)→N[S(t)], where t=final state, result in readable barcodes. This is due to the encoding algorithms used in the standards.

To further illustrate, suppose a set of barcodes corresponding to a set of states in a workflow differ by only one character in the original ASCII text before being written to the barcode along with the relevant error-correcting code (e.g., "1" is changed/replaced by "2"). In this scenario, the Hamming Distance (using Eqn. 1) between the two barcodes is 73, and the relative Hamming Distance is 73/324=0.225. Thus, there are 73 (out of 324) data modules which differ between the two barcodes. For two random binary strings, the relative Hamming Distance is 0.5. This example shows that error-correcting code changes the relative Hamming Distance by 22.2% even when only a single character is changed in the barcode payload (i.e., encoded bits), and thus emphasizes the fact that only a small percentage of the forward-looking state progression will result in legitimate readable barcodes. If the relative percentage of all possible barcode patterns that will be readable, p(Rb) is known, then we can set:

$$\{S(t-1) \to N[S(t)]\} * p(Rb) = \{N[S(t-1)] \leftarrow S(t)\} \qquad \text{Eqn. 3}$$

So that the probability of guessing backwards and forwards in the state transitions is equal. This can be achieved by considering the probabilities projecting forward. Accordingly, binary strings (or bitstreams) may be generated for each state in the workflow such that only the last binary string encoded in the last state is readable by the standard IO reader 130.

In one example, the regressive information object includes a 2D barcode, a 3D barcode, and a 4D barcode. In one example, where the regressive information object is a 4D barcode, color modules are added to the 4D barcode during the states in the workflow. In another example, the 4D barcode is fully saturated with color modules during the first state, however, during subsequent states in the workflow at least one color module is removed from the 4D barcode such that the 4D barcode (previously unreadable) is transformed to a readable 2D barcode in the last state of the workflow.

Figure 3:
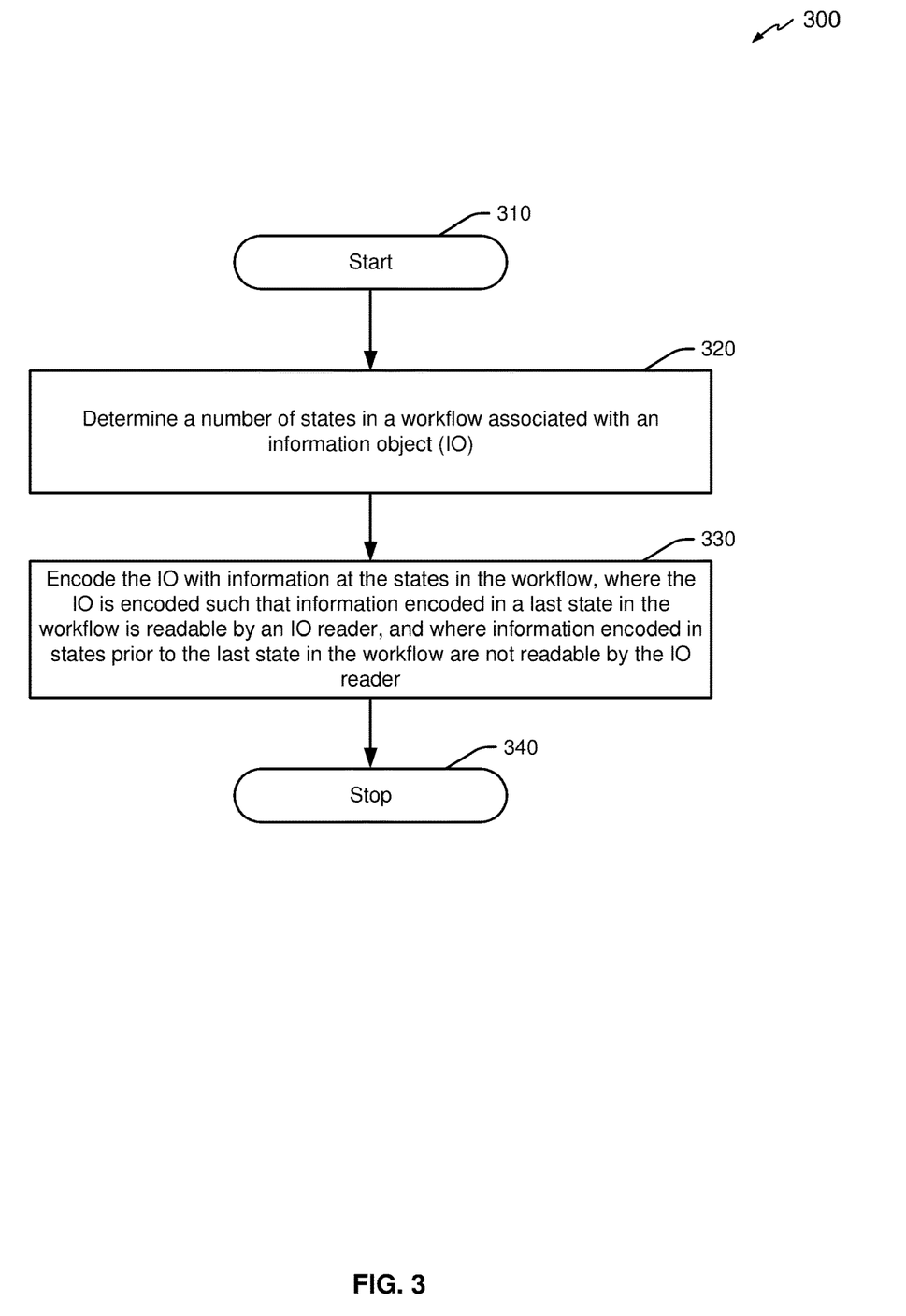
FIG. 3 is a flow diagram of a method for generating a regressive information object, according to one example.

FIG. 3 is a flow diagram of a method 300 for generating a regressive information object, according to one example. Method 300 may be implemented in the form of executable instructions stored on one or more non-transitory machine-readable storage media and/or in the form of electronic circuitry. Method 300 may start in block 310 and proceed to block 320, where a number of states in a workflow associated with an information object are determined. Prior to configuring the system 100 and its various components used to generate a regressive information object from an IO, the expected number of states in the workflow is determined. For example, the IO registry 120 may determine the number of states in the workflow. Thus, the number of states is determined beforehand (e.g., by a client). In this case, the IO registry 120 is provided with the number of states. To illustrate, a manufacturer's workflow may include three states comprising the manufacturer, a distributor, and a retailer. Thus, the number of states in this workflow is determined or identified to be three. In another example, the number of states in the workflow may be changed during progression in the workflow (i.e., dynamically). For example, one or more additional states may be added to the workflow. In this scenario, the number of states may not be determined beforehand.

Method 300 then proceeds to block 330, where the IO is encoded with information at each of the states in the workflow. In one example, the IO is encoded such that information encoded in a last state in the workflow is readable by an IO reader and information encoded in states prior to the last state in the workflow are not readable by the IO reader. For example, a series of incremental information objects may be generated at each subsequent state in the workflow, where the incremental information object contains related progressive information at each state in the workflow. The incremental information object is not readable by the standard IO reader until the last state in the workflow.

To illustrate, once the expected number of states in the workflow is identified, a number of bits to write in total and during each state in the workflow can be selected based on the probabilistic determinations described above. For example, the IO registry 120 may determine the number of bits to write in each state. In one example, bitstreams for each state in the workflow are selected to differentiate each state from other states in the workflow. Further, a final bitstream corresponding to the final state is selected such that the final bitstream is interpretable by IO readers 130, 140. Bitstreams corresponding to all states prior (i.e., non-final bitstreams) to the last state are selected such that the bitstreams are uninterpretable by the standard IO reader 130. For example, the non-final bitstreams may not include a predetermined number of 1's (i.e., sufficient 1's) to be interpretable by the standard IO reader 130. Method 300 may then proceed to block 340, where the method 300 stops.

Figure 4:
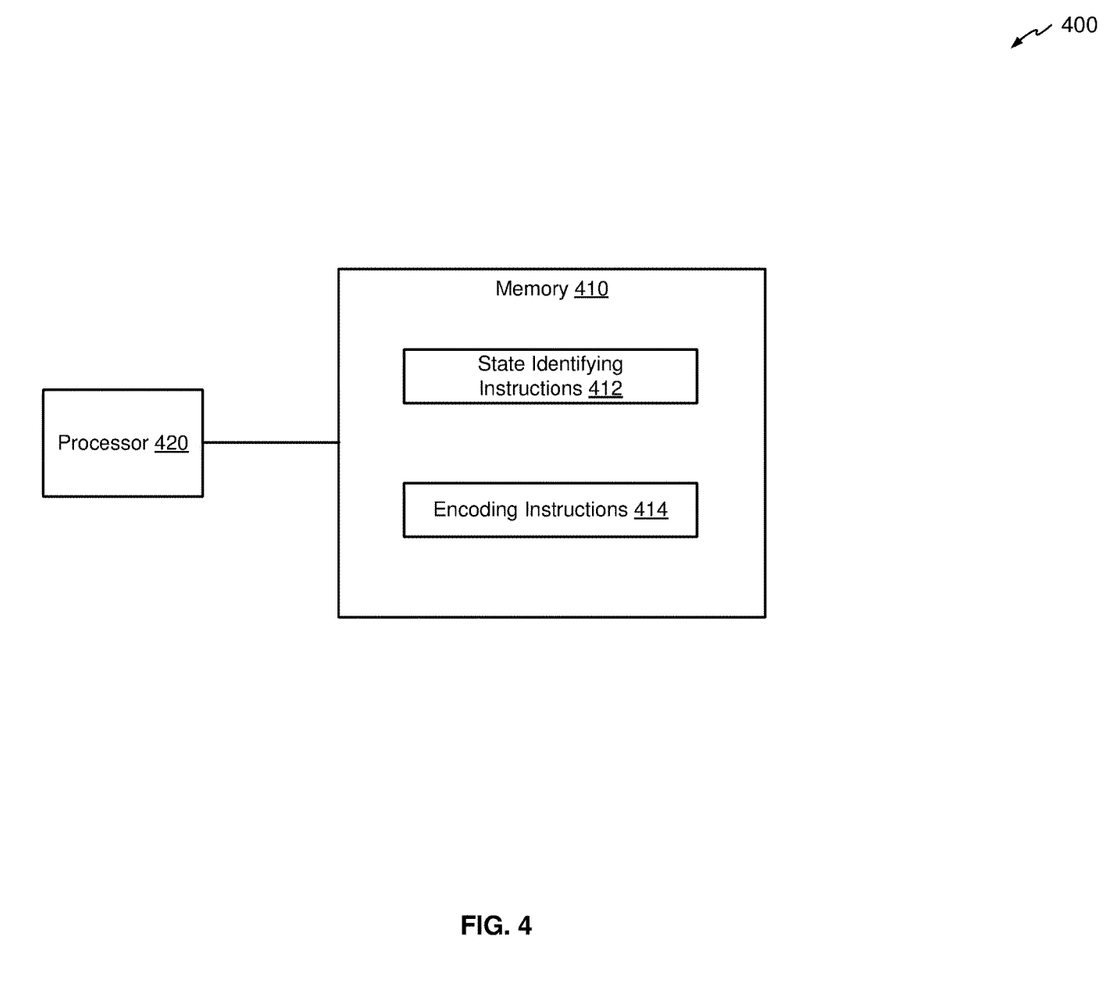
FIG. 4 is a block diagram of a memory containing code for generating a regressive information object, according to one example.

FIG. 4 is a block diagram of a memory containing code (i.e., instructions) for generating a regressive information object, according to one example. FIG. 4 includes a processor 420 coupled to a memory 410 including instructions 412 and 414 for generating a regressive information object. In one example, the processor 420 and memory 410 are part of the IO registry 120 of FIG. 1.

Processor 420 may be a microprocessor, a semiconductor-based microprocessor, other hardware devices or processing elements suitable for retrieval and execution of instructions stored in memory 410, or any combination thereof. Memory 410 may include a machine-readable storage medium or any other storage medium. Processor 420 may fetch, decode, and execute instructions stored in memory 410 to implement the functionality described in detail below. As an alternative or in addition to retrieving and executing instructions, processor 420 may include at least one integrated circuit (IC), other control logic, other electronic circuits, or any combination thereof that include a number of electronic components for performing the functionality of instructions 412 and 414 stored in memory 410. Further, processor 420 may include single or multiple cores in a chip, include multiple cores across multiple devices, or any combination thereof.

Memory 410 may be any non-transitory electronic, magnetic, optical, or other physical storage device that contains or stores executable instructions. Thus, memory 410 may be, for example, NVRAM, Random Access Memory (RAM), an Electrically Erasable Programmable Read-Only Memory (EEPROM), a storage drive, a Compact Disc Read Only Memory (CD-ROM), and the like. Further, memory 410 can be computer-readable as well as non-transitory. As described in detail below, memory 410 may be encoded with a series of executable instructions for generating a regressive information object. Other suitable formats of the executable instructions will be apparent to those of skill in the art.

Memory 410 may include state identifying instructions 412 for identifying and/or determining a number of states in a workflow associated with an information object. For example, the workflow may include a first state, one or more states, and a final or last state.

Memory 410 may include encoding instructions 414, which may be configured to encode the information object with information at each of the states of the workflow. The information is encoded such that information encoded in states prior to the last state in the workflow are not decodable by a standard IO reader and information encoded in the last state in the workflow is decodable by the standard IO reader.

What is claimed is:

1. A method for generating a regressive information object, comprising:
   determining a number of states as a product progresses in a workflow associated with the regressive information object tagged to the product;
   encoding the regressive information object with information at the determined number of states the workflow; and
   reading the regressive information object by an information object reader,
   wherein encoding the regressive information object with information comprises encoding the regressive information object with different bitstreams for the states in the workflow, the bitstreams to differentiate a particular state from other states in the workflow,
   wherein the regressive information object is encoded such that information encoded in a last state in the workflow is readable by the information object reader,
   wherein the product and the regressive information object are physical, electronic, or mixed, and
   wherein information encoded in states prior to the last state in the workflow are unreadable by the information object reader.

2. The method of claim 1, wherein encoding the regressive information object with information comprises generating a series of incremental information objects for the states in the workflow, wherein the series of incremental information objects contains related progressive information for the states in the workflow.

3. The method of claim 2, wherein the information object reader is a standards-compliant information object reader, wherein each of the series of incremental information objects encoded in the states of the workflow is readable by a custom information object reader, and wherein the custom information object reader includes proprietary algorithm for decoding the information encoded in each of the series of incremental information objects.

4. The method of claim 3, wherein the incremental information object is not readable by the standards-compliant information object reader until the last state in the workflow.

5. The method of claim 1, comprising encoding the last state with a final bitstream, wherein the final bitstream is interpretable by the information object reader.

6. The method of claim 1, wherein the states prior to the last state include less than a predetermined number of binary 1 values required for the information object reader to decode the information in the regressive information object.

7. The method of claim 6, wherein the last state includes at least the predetermined number of binary 1 values required for the information object reader to decode the information in the regressive information object.

8. The method of claim 1, wherein the regressive information object includes a barcode, a quick response (QR) code, a security mark, a carrier object, or an identifying object.

9. The method of claim 1, wherein the information object reader comprises at least one of a handheld device, a mobile device, and a barcode reader.

10. The method of claim 1, wherein encoding the regressive information object with information comprises encoding the regressive information object with a given level of statistical ambiguity.

11. An apparatus for generating a regressive information object, comprising:
    a processor; and
    a memory comprising instructions executable by the processor to:
        determine a number of states as a product progresses in a workflow associated with the regressive information object tagged to the product; and
        encode the regressive information object with information at the states in the workflow by writing a predetermined number of bits to the regressive information object in the states in the workflow, wherein the predetermined number of bits for the states is chosen such that the last state is decodable by a standard information object reader and other states by the standard information object reader, wherein the product and the regressive information object are physical, electronic, or mixed.

12. The apparatus of claim 11, the instructions executable by the processor to encode the regressive information object by decrementing the regressive information object from a desired last.

13. The apparatus of claim 11, wherein the predetermined number of bits for the states is chosen such that a probability of guessing a previous state is equal to a probability of guessing a next state in the workflow.

14. The apparatus of claim 11, wherein the predetermined number of bits corresponding to the last state represents an interpretable binary string, and wherein the predetermined number of bits corresponding to other states represents an uninterpretable binary string.

* * * * *